United States Patent

Eastman et al.

[11] Patent Number: 5,561,645
[45] Date of Patent: Oct. 1, 1996

[54] METHOD AND APPARATUS FOR FOCUSING A RECORDING LIGHT BEAM ON A RECORDING MEDIUM

[75] Inventors: Clarke K. Eastman, Rochester; Daniel L. Nelson; Gerald J. Smart, both of Penfield, all of N.Y.

[73] Assignee: Eastman Kodak Company, Rochester, N.Y.

[21] Appl. No.: 517,306

[22] Filed: Aug. 21, 1995

Related U.S. Application Data

[63] Continuation of Ser. No. 179,477, Jan. 10, 1994, abandoned.

[51] Int. Cl.$^6$ ........................................ G11B 7/09
[52] U.S. Cl. .................... 369/44.29; 369/44.35; 369/54
[58] Field of Search .................. 369/44.35, 44.36, 369/44.29, 44.34, 54, 44.26, 44.32, 44.27; 250/201.5

[56] References Cited

U.S. PATENT DOCUMENTS

| | | | |
|---|---|---|---|
| 4,707,648 | 11/1987 | Minami | 369/44.35 |
| 4,907,212 | 3/1990 | Pharris et al. | 369/54 |
| 5,077,719 | 12/1991 | Yanagi et al. | 369/44.29 X |
| 5,097,458 | 3/1992 | Suzuki | 369/44.35 |
| 5,142,520 | 8/1992 | Yanagi et al. | 369/48 |
| 5,251,194 | 10/1993 | Yoshimoto et al. | 369/44.29 X |
| 5,351,224 | 9/1994 | Nagata et al. | 369/44.29 |

*Primary Examiner*—W. R. Young
*Assistant Examiner*—Thang V. Tran
*Attorney, Agent, or Firm*—James D. Leimbach

[57] ABSTRACT

A method and apparatus for, in an optical data recorder, focusing a recording light beam on a recording medium. In the apparatus, an optical head has focusing means movable in a direction perpendicular to the recording medium for changing the focus position of the recording light beam on the recording medium. The method comprises the steps of: i) detecting light reflected from the optical recording medium and for producing a corresponding focus error signal; ii) generating a mark formation effectiveness signal for each of a plurality of trial focus positions, each mark formation effectiveness signal being associated with a given value of the focus error signal; iii) determining the mark formation effectiveness signal corresponding to an in-focus position and determining an offset value of the associated focus error signal; and iv) during data recording periods, in response to the focus error signal, adjusting the position of the movable focusing means so that the value of the focus error signal is maintained at the offset value.

10 Claims, 5 Drawing Sheets

METHOD AND APPARATUS FOR FOCUSING A RECORDING LIGHT BEAM ON A RECORDING MEDIUM

This is a Continuation of U.S. application Ser. No. 08/179,477, filed Jan. 10, 1994, now abandoned.

CROSS REFERENCE TO RELATED APPLICATIONS

The present invention is related to the following U.S. Patent Applications: "Write Verification In An Optical Recording System By Sensing Mark Formation While Writing", Ser. No. 08/179,472, now U.S. Pat. No. 5,495,466; "Laser Power Control In An Optical Recording System Using Partial Correction Of Reflected Signal Error", Ser. No. 08/179,476, now U.S. Pat. No. 5,436,880; "Laser Power Control To Compensate For Multiple System Degradations", Ser. No. 08/179,394, now U.S. Pat. No. 5,446,716; and "Method And Apparatus For Maintaining A Recording Light Beam In An On-Track Position On A Recording Medium", Ser. No. 08/179,474, now U.S. Pat. No. 5,440,534, all filed concurrently with the present application, assigned to the assignee of the present invention, the disclosures of which are incorporated herein by reference.

FIELD OF THE INVENTION

The present invention relates to optical data recorders, and more particularly to focusing a recording light beam on a recording medium.

BACKGROUND OF THE INVENTION

High density optical recording is becoming more and more prevalent and such systems typically employ a light beam which is focused on a recording medium to produce a pit or a mark. It is of course important that the light beam be "in focus" when recording takes place so that the resulting marks are of high quality. Heretofore, this has been accomplished in the following manner. The light beam from an optical source, such as a laser diode, is reflected by the recording medium and in turn illuminates two or more photodetectors. Differences in focus position produce variations in the illumination pattern on the photodetectors. As a result of differences in illumination, these photodetectors produce different signals, from which a focus error signal is computed. The write focus "offset" is defined as the focus error signal which occurs when the recording beam is in focus. If the focus error signal during data recording is different from the predetermined offset value, then there is an error and the position of the optical head is adjusted. For good quality recording in high data density systems, such as recordable CDs, this focus offset value must be determined accurately. The focus offset is typically determined empirically for each optical head to compensate for optical alignment inaccuracies. One way this has been accomplished is to record data with the optical head at a variety of trial focus offsets and to subsequently examine the quality of the recorded marks. The trial focus offset which produced the highest quality recording is chosen as the optimum offset value. See, for example, U.S. Pat. No. 5,077,719 (column 5, lines 31–38). A problem with this method is that it requires both record and read back steps.

Another approach has been to calculate the best offset for reading the optical recording media or disk and to assume that it is also the best offset value for recording. See, for example, U.S. Pat. No. 4,707,648 and U.S. Pat. No. 5,142,520. This may not be a valid assumption for several reasons. For example, illumination powers for recording are significantly higher than for reading. This may affect the response of sensor elements and/or signal processing electronics. Also, there are physical changes which occur in the optical medium during recording, which of course do not occur during reading. The complicated structure of some recording media may also result in different optimum illuminating beam focus positions for reading versus recording.

SUMMARY OF THE INVENTION

It is an object of this invention to provide, in an optical data recorder, an improved way for determining the desired offset value to be used in focusing a recording light beam on an optical recording medium.

This object is achieved in an optical data recorder for focusing a recording light beam on an optical recording medium, the improvement comprising:

an optical head including a recording light beam, the head having focusing means movable in a direction perpendicular to the recording medium surface for changing the focus position of the recording light beam as the recording light beam writes data on the optical recording medium;

focus sensing means for detecting light reflected from the optical recording medium as the recording light beam writes on the optical recording medium and for producing a corresponding focus error signal;

means for, during calibration periods, generating a mark formation effectiveness signal for each of a plurality of trial focus positions, each mark formation effectiveness signal being associated with a given value of the focus error signal of the focus sensing means;

means for determining the mark formation effectiveness signal corresponding to an in-focus position of the recording light beam on the optical recording medium and for determining an offset value of the associated focus error signal; and means responsive to the focus error signal during data recording for adjusting the position of the movable focusing means so that the value of the focus error signal is maintained at the offset value.

This object is achieved in a method for, in an optical data recorder having an optical head including a recording light beam, focusing the recording light beam on a recording medium, the optical head having focusing means movable in a direction perpendicular to the recording medium for changing the focus position of the recording light beam as it writes data on the recording medium, the method comprising the steps of:

detecting light reflected from the optical recording medium as the recording light beam writes on the optical recording medium and producing a corresponding focus error signal;

during calibration periods, generating a mark formation effectiveness signal for each of a plurality of trial focus positions, each mark formation effectiveness signal being associated with a given value of the focus error signal;

determining the mark formation effectiveness signal corresponding to an in-focus position of the recording light beam on the optical recording medium, and determining an offset value of the associated focus error signal; and adjusting, during data recording periods, in response to the focus error signal, the position of the movable focusing means so that the value of the focus error signal is maintained at the offset value.

The following are advantages of the invention. Desired focus offset values can be determined during the actual recording process. Accurate offset values can be obtained in a more efficient and simpler way than in the devices and processes of the prior art (as compared with U.S. Pat. No. 5,077,719, for example). Further, the present invention provides more accuracy than in the prior art arrangement (see, for example, U.S. Pat. Nos. 4,707,648 and 5,142,520) in which the assumption was made that the offset value was the same in readback as in recording.

Further features of the invention, its nature and various advantages will become more apparent from the accompanying drawings wherein like characters indicate like parts and following detailed description of the invention.

DETAILED DESCRIPTION OF THE PREFERRED EMBODIMENTS

Figure 1:
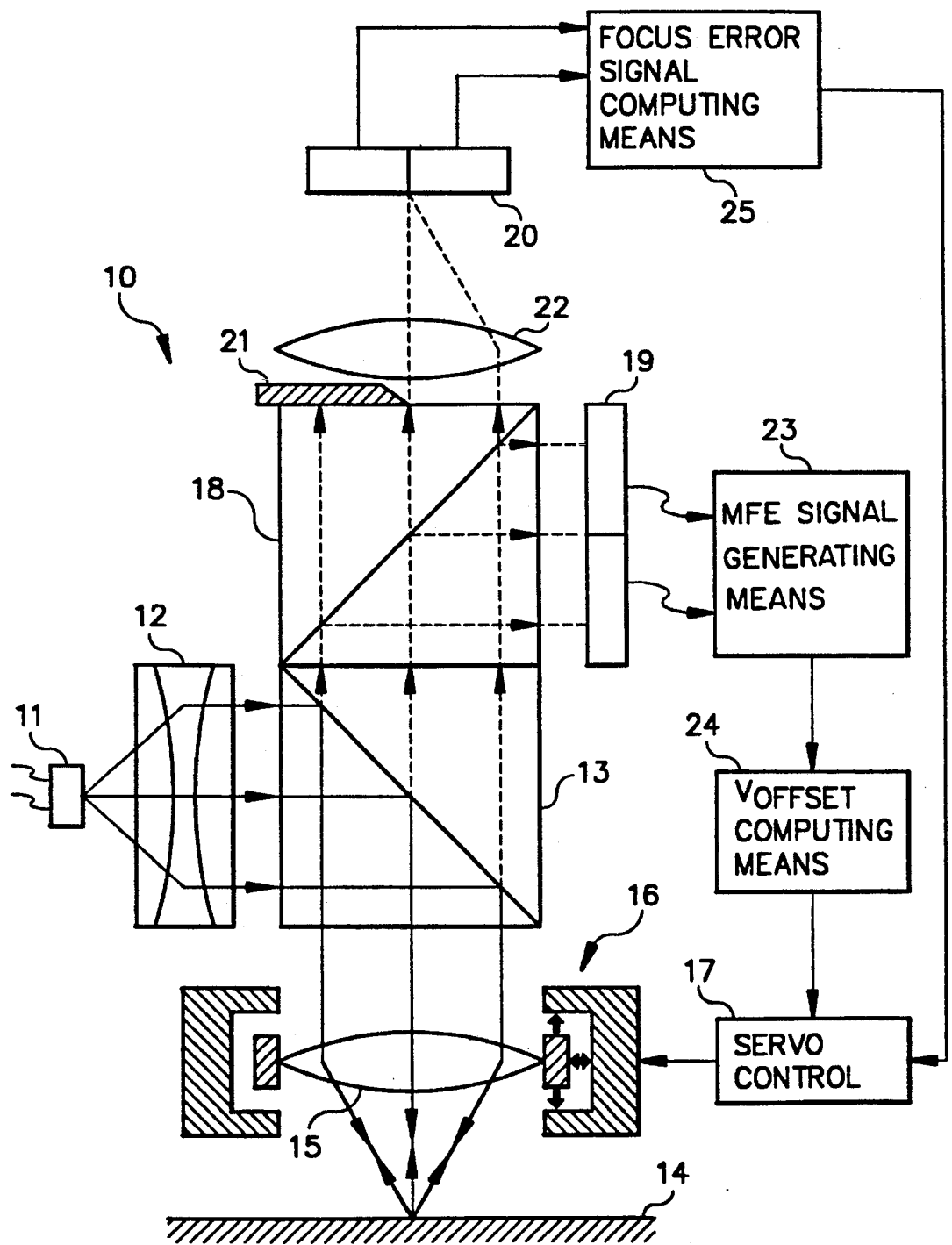
FIG. 1 is a schematic of an optical data recording head for focusing a light beam on an optical recording medium in accordance with the present invention.

FIG. 1 shows an optical data recording head 10 having an optical source 11 for generating a recording light beam. Typically, the recording light beam is a laser light beam. Light emitted from the optical source 11 first passes through collimating and beam shaping optics 12 and then passes through a first beam splitter 13 at which it is reflected toward the optical recording medium 14 for recording purposes, through a focusing lens 15. The recording medium 14 may be comprised of, for example, a recordable CD optical disk.

The focusing lens 15 is mounted on a focus and tracking actuator 16 which is designed to move the focusing lens either in a direction perpendicular to the recording medium surface for changing the focus of the recording light beam on the optical recording medium, or in a direction parallel to the recording medium in order to maintain the recording medium in an on-track position with respect to a tracking structure on the recording medium. The focus and tracking actuator 16 may include, for example, different well-known arrangements of coils and electro-magnets (not shown) which are controlled by a servo control system 17 to be discussed in detail below.

The light reflected from the recording medium 14 passes through the focusing lens 15, the first beam splitter 13, and a second beam splitter 18 at which the reflected beam is divided into two main components. A first component of the reflected beam is sent to tracking and reflected light photodetectors 19 which produce tracking information as well as information regarding the reflectivity of the medium 14 by a method such as direct read during write (DRDW). The signal representative of the reflectivity of the medium is obtained typically by summing the electrical signals produced by the tracking and reflected light photodetectors. The other component of the reflected light falls on a focus photodetector assembly 20 through a collimating lens 22 and a limiting aperture 21. The focus photodetector assembly 20 generates signals that are used by focus error signal computing means 25. This will be described in more detail below. As an alternative, the focus and tracking signals could be generated by a single photodetector assembly.

Figure 2C:
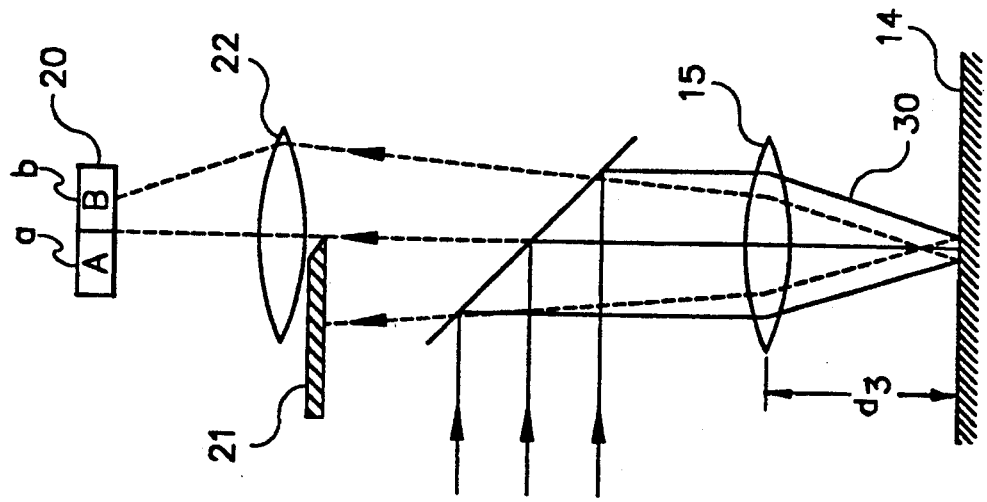
FIGS. 2A–2C illustrate schematically the amount of light received by the focus sensing arrangement used in an apparatus in accordance with the present invention for different focus positions.
Figure 2B:
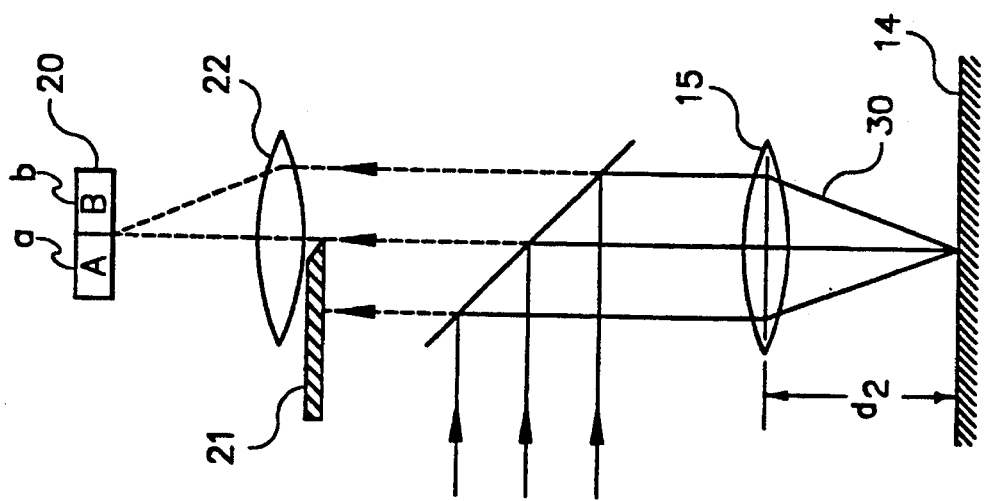
Figure 2A:
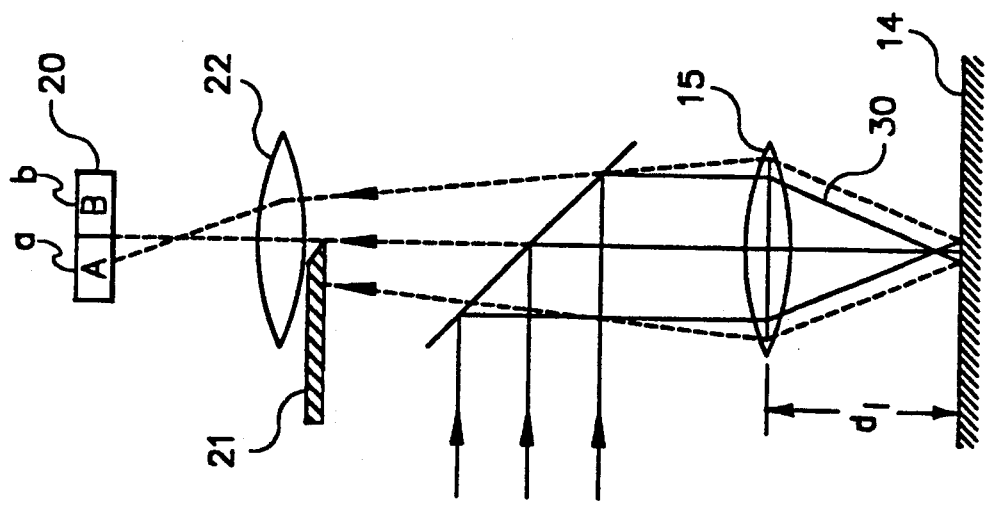

FIGS. 2A–2C illustrate an exemplary embodiment of a focus photodetector assembly which can be used according to the present invention. As shown in FIGS. 2A–2C, the focus photodetector assembly 20 comprises two adjacent photodetectors A, B. Silicon photodiodes, such as positive-intrinsic-negative (PIN) or avalanche photodiodes can be used as the photodetectors A, B. It should be understood that a different number and type of photodetectors may also be used. Each of the photodetectors receives an amount of light which depends on the focus position of the recording beam 30 on the medium 14. The light received by each of the photodetectors A, B is converted into electrical signals a, b, produced at their respective outputs and connected to processing apparatus, such as the focus error signal computing means 25. As shown in FIGS. 2A–2C, as the focusing lens-to-medium distance d1, d2, d3 varies (d1≧d2≧d3), the relative distribution of illumination at the photodetectors A and B varies. In FIG. 2A, the focusing lens 15 is too far from the recording medium so that a greater amount of light is received by photodetector A than by photodetector B. In FIG. 2B, the recording beam is in focus on the disk 14, so that approximately the same amount of light is received by both photodetectors A and B. In FIG. 2C, the focusing lens 15 is too close to the disk 14 so that a greater amount of light is received by photodetector B.

Figure 3:
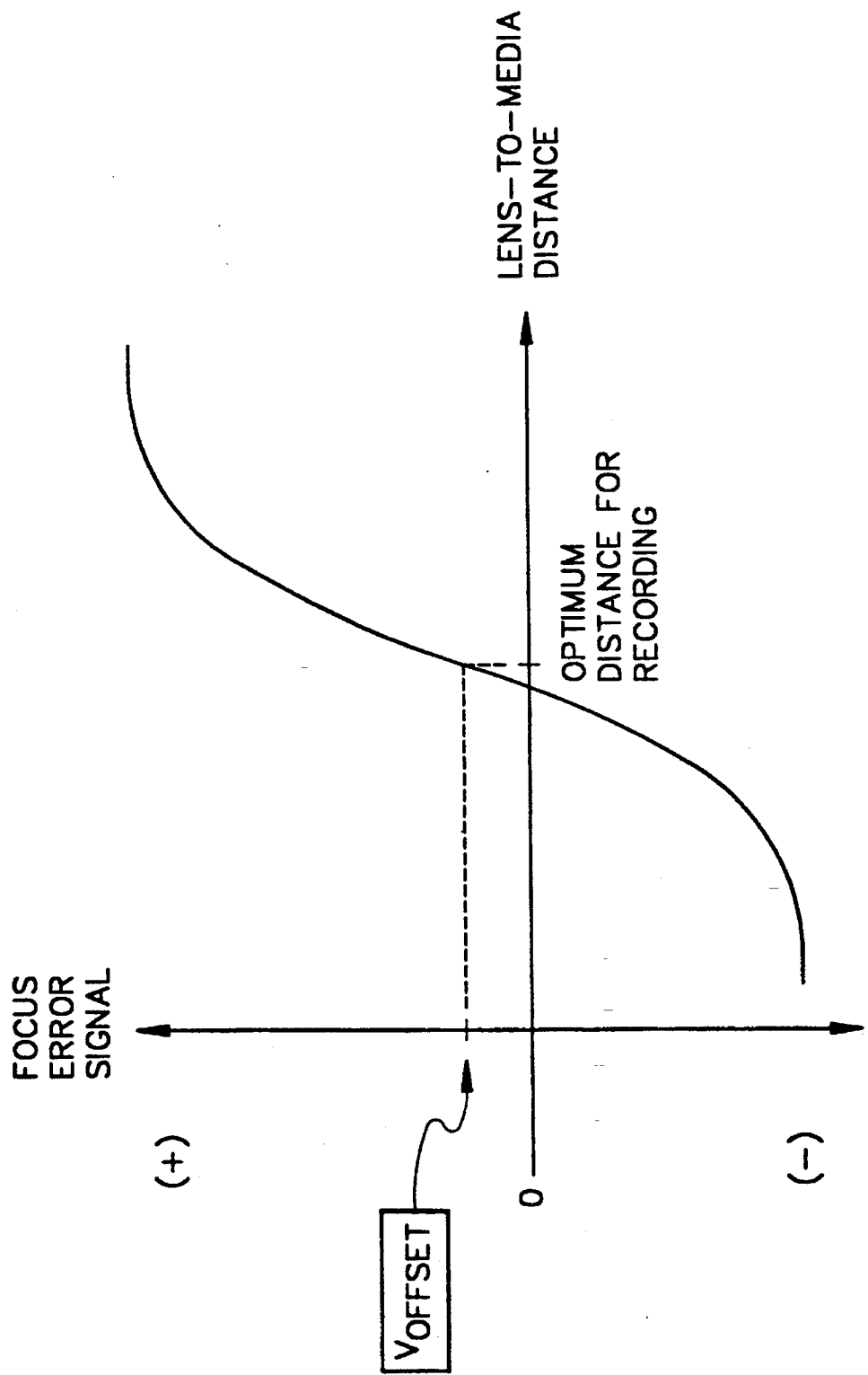
FIG. 3 is a graph illustrating the focus error signal as a function of the focus position.

A focus error signal is generated from signals a and b which are produced by each of the photodetectors A and B. An exemplary focus error signal may be generated as the difference between the signals a and b. As an alternative, a normalized focus error signal can be generated by computing the ratio $(a-b)/(a+b)$. An advantage of the normalized tracking error signal is that it does not depend on the absolute amount of reflected light. It depends only on the relative illumination of the photodetectors A and B. As seen in FIG. 3, which shows the focus error signal as a function of the lens-to-medium distance, the distance for optimum recording produces an error signal $V_{OFFSET}$ which is different from zero. This is due to the fact that alignment of the photodetectors is usually not perfect. In other words, an in-focus situation corresponds to a focus error signal, $V_{OFFSET}$, which can be different from zero. Accordingly, in order to maintain the recording device in an in-focus position, the focus error signal $V_{OFFSET}$ has to be determined. This value is measured during calibration periods which can be performed each time there are reasons for which $V_{OFFSET}$ is not known or might have changed. Usually, such a calibration is performed as part of the manufacturing process of the optical data recorder or during the initialization of the recorder.

In accordance with one preferred embodiment of the present invention, $V_{OFFSET}$ is determined by generating a mark formation effectiveness (MFE) signal for each of several lens-to-medium distances.

Figure 4A:
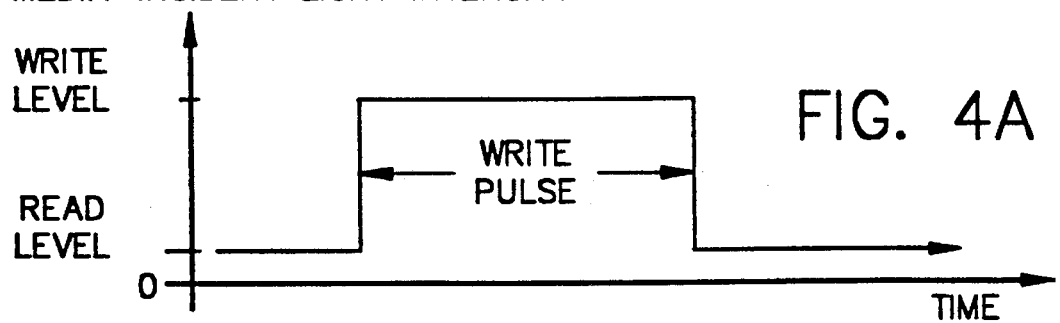
FIGS. 4A–4D illustrate an exemplary reflected write pulse for which a mark formation effectiveness (MFE) signal may be generated in accordance with the present invention.
Figure 4B:
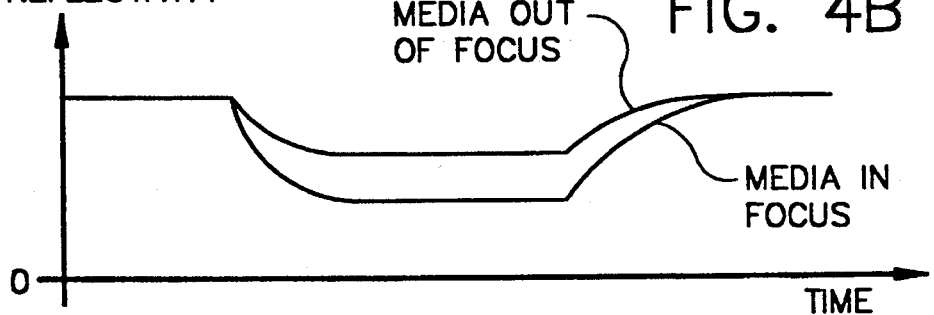
Figure 4C:
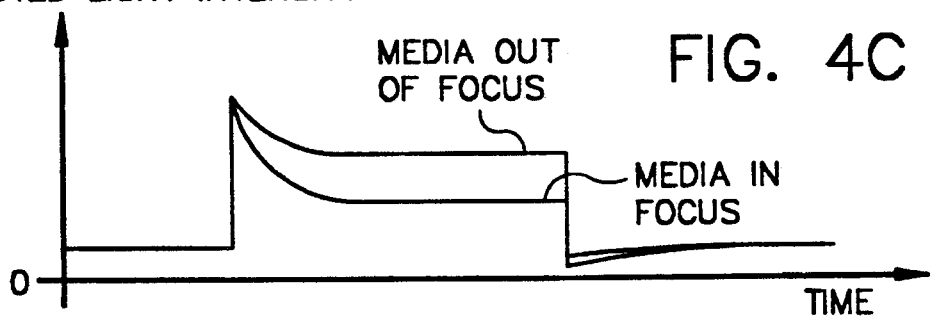
Figure 4D:
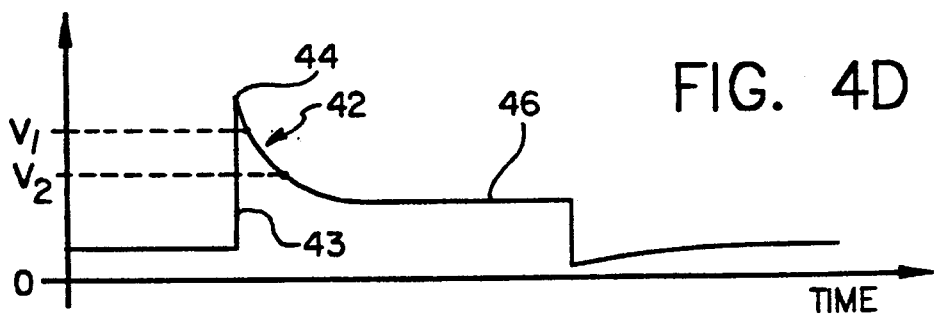

FIGS. 4A–4D illustrate the generation of MFE signals by a direct read during write (DRDW) technique. FIG. 4A shows an incident write pulse with write and read power levels. FIG. 4B is a graph illustrating the media reflectivity versus time, i.e. before, during and after a write pulse for both in and out of focus conditions. The media used in the illustrated embodiment is a "burn dark" medium, and therefore the medium reflectivity decreases during the write pulse. The same principle could be used for a "burn bright" medium, for which an increase in reflectivity would be observed during the write pulse. In a "burn dark" medium, reflectivity decreases by a greater extent when the medium is in-focus than when the medium is out-of-focus. FIG. 4C is a graph of an exemplary reflected write signal as a function of time for in and out of focus conditions. The reflected write signal includes a reflected write pulse for both in and out of focus conditions. Such a reflected write signal can be generated, for example, from the signals issued from the photodetector assembly 19 shown in FIG. 1. As shown in FIG. 4D, a reflected write pulse 42 decreases from an initial peak voltage 44 at a rising edge 43 of the write pulse 42 to a steady-state plateau voltage 46. The plateau voltage 46 is typically higher for an out-of-focus position than for an in-focus position, as shown in FIG. 4C. An MFE signal, which varies with a rate of change of the reflected pulse 42 as a mark is formed on the optical medium, may be determined from the voltages $V_1$ and $V_2$. Exemplary MFE signals include the quotient $V_1/V_2$, or the difference between $V_1$ and $V_2$. The MFE signal $V_1/V_2$ corresponds to one exemplary type of reflected pulse rate of change, the decay rate of the decreasing portion of the reflected write pulse between the peak voltage 44 and the plateau voltage 46. Various linear and nonlinear transformations of the quotient $V_1/V_2$ may also be used as MFE signals herein.

The first and second voltages $V_1$ and $V_2$ are presently preferred to be voltages on the decaying portion of the reflected pulse 42. Alternatively, the first voltage $V_1$ used to compute the MFE signal may be the peak voltage 44 of the reflected pulse 42, and the second voltage $V_2$ may be the plateau voltage 46. Additional detail regarding presently preferred MFE signals suitable for use with the present invention may be found in the above-cited U.S. patent application Ser. No. 08/179,472.

Figure 5:
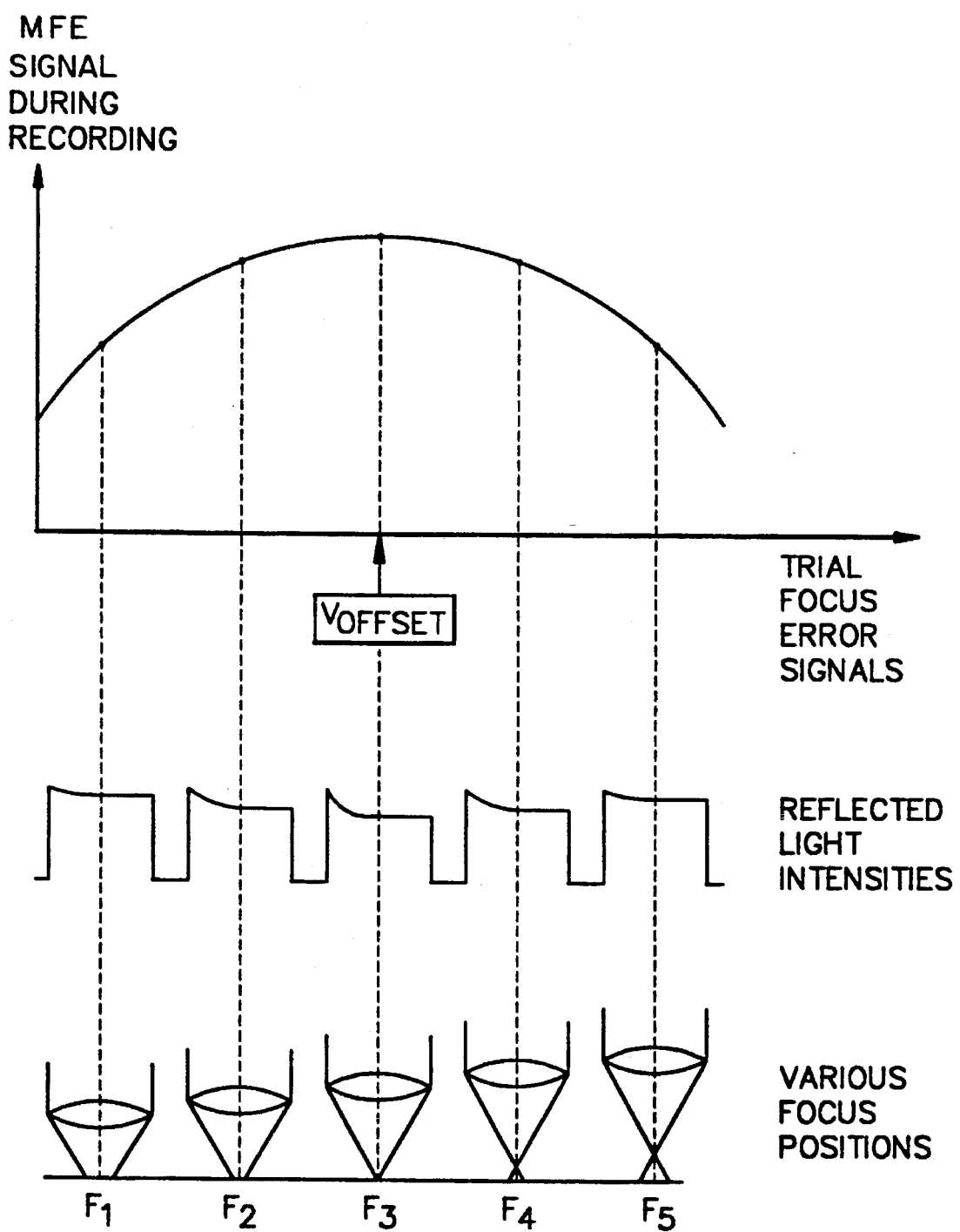
FIG. 5 illustrates different MFE signals for different trial focus positions.

In one embodiment of the present invention, MFE signal generating means, such as the MFE signal generating means of FIG. 1 or the MFE signal generating means of U.S. patent application Ser. No. 08/179,472, are used to compute an MFE signal. The MFE signal generation process is repeated for various trial focus positions, $F_1$ to $F_5$, i.e. for different lens-to-medium distances, as illustrated in FIG. 5. An MFE signal is computed for each of the trial focus positions, and each of the MFE signals is associated with a corresponding value of the focus error signal. Processor means, such as a computer or programmed microprocessor, are then used to determine the best MFE signal along with its associated focus error signal, $V_{OFFSET}$.

Referring back to FIG. 1, in response to $V_{OFFSET}$ previously determined by the MFE signal generating means 23 and by the $V_{OFFSET}$ computing means 24, and in response to the focus error signal provided by the focus error signal computing means 25 during actual data recording periods, the servo control 17 adjusts the position of the focusing lens 15 so that the focus error signal produced by the photodetectors 20 is restored to and maintained at the value $V_{OFFSET}$ corresponding to the in-focus position, as determined herebefore.

The recording light beam may be used to determine $V_{OFFSET}$ during the calibration process. Alternatively, a light beam other than the recording light beam could be used. For example, in an optical recorder based on the direct read after write (DRAW) method, data which have been recorded using a first laser light beam are read by using a second laser light beam which closely follows the first one. In a DRAW system, the second laser light beam could be used for determining $V_{OFFSET}$.

As is apparent from the foregoing description, the method according to the invention is advantageous in that it does not require a separate read-back step to evaluate the quality of the recording process and to determine the best focus offset value.

The invention has been described in detail with particular reference to certain exemplary embodiments thereof, but it will be understood that variations and modifications can be effected within the spirit and scope of the invention.

| PARTS LIST | |
|---|---|
| A | photodetector |
| B | photodetector |
| $F_1$ | trial focus position |
| $F_2$ | trial focus position |
| $F_3$ | trial focus position |
| $F_4$ | trial focus position |
| $F_5$ | trial focus position |
| $V_{OFFSET}$ | focus error signal |
| $V_1$ | initial peak voltage or value |
| $V_2$ | steady-state plateau voltage or value |
| a | electrical signal produced by A |
| b | electrical signal produced by B |
| $d_1$ | FIG. 2A focusing lens-to-medium distance |
| $d_2$ | FIG. 2B focusing lens-to-medium distance |
| $d_3$ | FIG. 2C focusing lens-to-medium distance |
| 10 | optical data recording head |
| 11 | recording light source |
| 12 | beam shaping optics |
| 13 | first beam splitter |
| 14 | optical recording medium |
| 15 | focusing lens |
| 16 | focusing and tracking actuator |
| 17 | servo control system |
| 18 | second beam splitter |
| 19 | tracking and reflected light photodetector assembly |
| 20 | focus photodetector assembly |
| 21 | limiting aperture |
| 22 | collimating lens |
| 23 | mark function signal generating means |
| 24 | $V_{OFFSET}$ computing means |
| 25 | focus error signal computing means |
| 30 | recording beam |
| 42 | relfected write pulse |
| 43 | reflected write pulse rising edge |
| 44 | reflected write pulse peak voltage |
| 46 | reflected write pulse plateau voltage |

What is claimed is:

1. In an optical data recorder for focusing a recording light beam on an optical recording medium, the improvement comprising:

an optical head including a recording light beam, such head having focusing means movable in a direction perpendicular to the recording medium surface for changing the focus position of the recording light beam as it writes data on said optical recording medium;

focus sensing means for detecting light reflected from said optical recording medium as said recording light beam writes on said optical recording medium and for producing a corresponding focus error signal during recording;

means for, during recording periods, generating a mark formation effectiveness signal for each of a plurality of trial focus positions, based on a reflected write pulse that is reflected back from said optical recording medium during formation of a mark at said trial focus positions, each mark formation effectiveness signal being associated with a given value of the focus error signal of said focus sensing means;

means for receiving said mark formation effectiveness signal for each of said trial focus positions, determining a mark formation effectiveness signal that corresponds to an in-focus position of said recording light beam on said optical recording medium therefrom, and for determining an offset value, based on said mark formation effectiveness signal that corresponds to said in-focus position for the associated focus error signal; and means for receiving said offset value and said focus error signal during data recording and for adjusting the position of said movable focusing means so that said recording light beam is maintained at said in-focus position.

2. The recorder of claim 1 wherein said mark formation effectiveness signal varies with a rate of change of the reflected write pulse, said rate of change resulting from variation in a reflectivity of said optical recording medium as the mark is formed thereon.

3. The recorder of claim 2 wherein a voltage level of said reflected write pulse decreases as a function of time from a first voltage to a second voltage during formation of said mark, and said rate of change is a decay rate of said voltage level from said first to said second voltage.

4. The recorder of claim 3 wherein said mark formation effectiveness signal is a quotient of said first voltage and said second voltage.

5. The recorder of claim 3 wherein said mark formation effectiveness signal is a transformation of a quotient of said first and said second voltage.

6. A method for, in an optical data recorder having an optical head including a recording light beam, focusing said recording light beam on an optical recording medium, said optical head having focusing means movable in a direction perpendicular to said optical recording medium for changing the focus position of said recording light beam as it writes data on said optical recording medium, the method comprising the steps of:

detecting light reflected from said optical recording medium as said recording light beam writes on said optical recording medium, and producing a corresponding focus error signal during recording;

during recording periods, generating a mark formation effectiveness signal for each of a plurality of trial focus positions, based on a reflected write pulse that is reflected back from said optical recording medium during formation of a mark at said trial focus positions, each mark formation effectiveness signal being associated with a given value of said focus error signal;

receiving said mark formation effectiveness signal for each of said trial focus positions;

determining a mark formation signal corresponding to an in-focus position of said recording light beam on said optical recording medium, and determining an offset value based on said mark formation signal that corresponds to said in-focus position for said associated focus error signal; and adjusting, during data recording periods, in response to said focus error signal, the position of said movable focusing means so that said offset value of said focus error signal is maintained at said in-focus position.

7. The method of claim 6 wherein the step of generating a mark formation effectiveness signal includes detecting a rate of change of said reflected write pulse, said rate of change resulting from variation in reflectivity of said optical recording medium as said mark is formed thereon.

8. The method of claim 7 wherein a voltage level of said reflected write pulse decreases as a function of time from a first voltage to a second voltage during formation of said mark, and said rate of change is a decay rate of said voltage level from said first to said second voltage.

9. The method of claim 8 wherein said mark formation effectiveness signal is a quotient of said first voltage and said second voltage.

10. The method of claim 8 wherein said mark formation effectiveness signal is a transformation of a quotient of said first and second voltage.

* * * * *